(12) United States Patent
Colombo et al.

(10) Patent No.: US 9,356,655 B2
(45) Date of Patent: May 31, 2016

(54) METHOD OF OPERATING COMMUNICATION NETWORKS, CORRESPONDING COMMUNICATION NETWORK AND COMPUTER PROGRAM PRODUCT

(71) Applicant: STMICROELECTRONICS S.R.L., Agrate Brianza (IT)

(72) Inventors: Mauro Colombo, Milan (IT); Alessandro Moscatelli, Como (IT); Carlo Masseroni, Cornaredo (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 0 days.

(21) Appl. No.: 14/791,966

(22) Filed: Jul. 6, 2015

(65) Prior Publication Data
US 2016/0020828 A1    Jan. 21, 2016

(30) Foreign Application Priority Data
Jul. 15, 2014 (IT) .............................. TO2014A0563

(51) Int. Cl.
| | |
|---|---|
| *H04B 3/56* | (2006.01) |
| *H04B 3/54* | (2006.01) |
| *H04L 12/28* | (2006.01) |
| *H04L 12/44* | (2006.01) |
| *H04L 29/12* | (2006.01) |

(52) U.S. Cl.
CPC .................. *H04B 3/56* (2013.01); *H04B 3/544* (2013.01); *H04B 2203/5408* (2013.01); *H04B 2203/5445* (2013.01); *H04L 12/2801* (2013.01); *H04L 12/44* (2013.01); *H04L 61/2038* (2013.01)

(58) Field of Classification Search
CPC ............ H04B 3/54; H04B 3/56; H04L 12/44; H04L 2012/445; H04L 12/2801
See application file for complete search history.

(56) References Cited

U.S. PATENT DOCUMENTS

| | | | |
|---|---|---|---|
| 8,536,985 B1 * | 9/2013 | Wedding ................ | H04B 3/542 340/12.34 |
| 2005/0007241 A1 * | 1/2005 | Kline ....................... | H04B 3/54 370/464 |
| 2007/0091909 A1 * | 4/2007 | Hibino et al. ................. | 370/401 |
| 2012/0307624 A1 * | 12/2012 | Vasseur et al. ................ | 370/221 |
| 2013/0121427 A1 * | 5/2013 | Sun et al. ...................... | 375/257 |
| 2013/0170336 A1 * | 7/2013 | Chen et al. .................... | 370/221 |
| 2013/0279365 A1 * | 10/2013 | Hui et al. ...................... | 370/253 |

FOREIGN PATENT DOCUMENTS

| | | |
|---|---|---|
| DE | 102004025056 | 12/2005 |
| RU | 2352065 | 4/2009 |
| WO | 0215413 | 2/2002 |

* cited by examiner

*Primary Examiner* — Aristocratis Fotakis
(74) *Attorney, Agent, or Firm* — Allen, Dyer, Doppelt, Milbrath & Gilchrist, P.A.

(57) ABSTRACT

A method of operating a Power Line Communications (PLC) network including a plurality of nodes having wirelines extending therebetween for propagating PLC signals between said nodes over said wirelines. The method includes coupling to a set of nodes of the PLC network respective partitioning filters, which can be activated for countering propagation of the PLC signals through the nodes to which said partitioning filters are coupled. The method also includes selectively activating filters chosen from among said partitioning filters, so that said PLC network is partitioned into a plurality of sub-networks with the propagation of PLC signals between the various sub-networks countered by the activated partitioning filters.

9 Claims, 3 Drawing Sheets

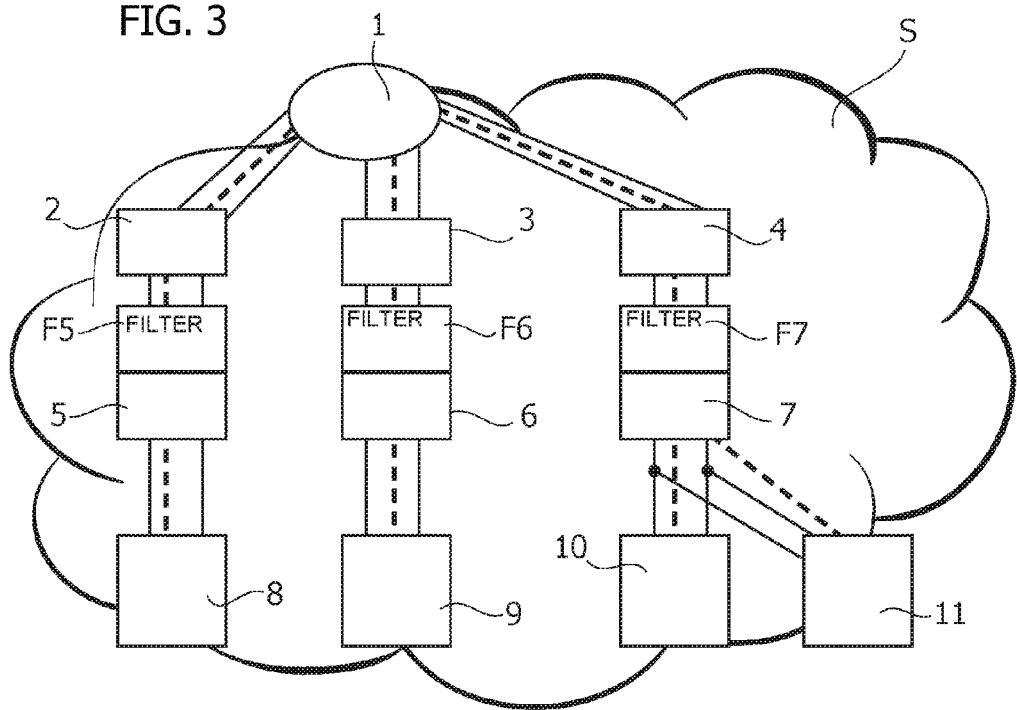
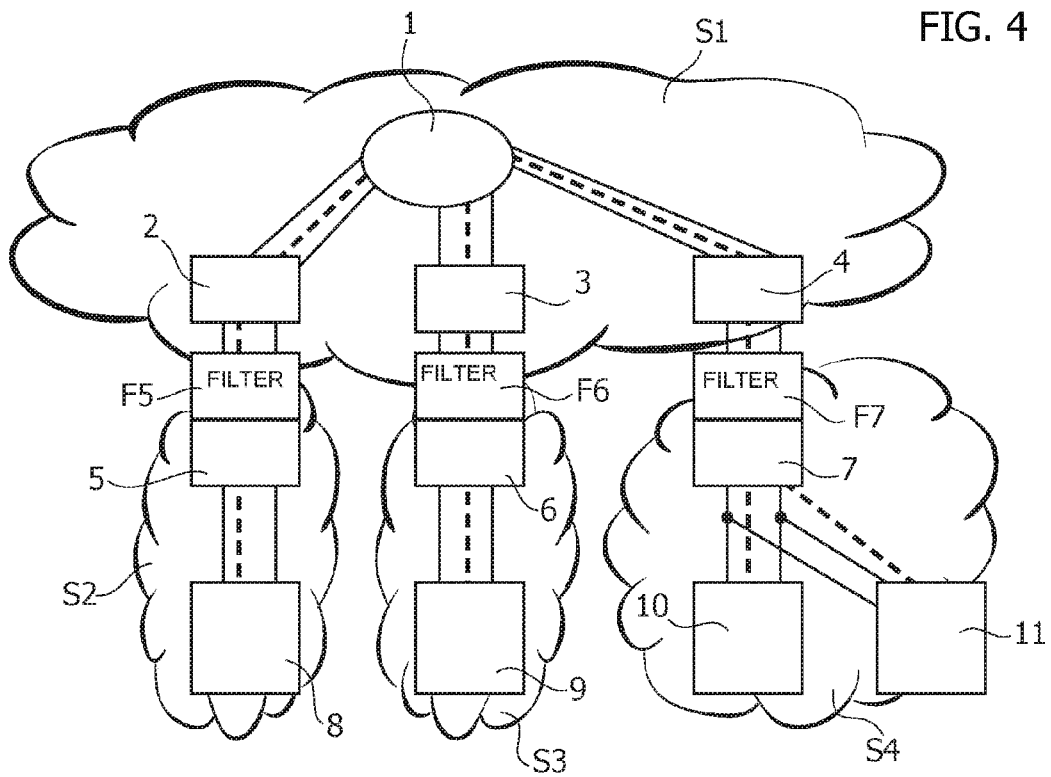

METHOD OF OPERATING COMMUNICATION NETWORKS, CORRESPONDING COMMUNICATION NETWORK AND COMPUTER PROGRAM PRODUCT

FIELD OF THE INVENTION

The present disclosure relates to communication networks. One or more embodiments may find application in communication networks operating according to the technology known as Power Line Communications (PLC).

BACKGROUND

The technology referred to as "Power Line Communications" or PLC enables exchange of information signals (for example, data) over a wired network. This network may include pre-existing wires that are able to convey d.c. or a.c. electrical energy, or else by electrical connections exclusively assigned to the PLC. It may be, for example, an electric-power distribution network already deployed over the territory in which the physical connections (namely the wires) provided for distribution of electric power can be used for transmitting modulated signals.

A PLC network may comprise a number of nodes that are able to exchange data with one another by sharing a communication circuit and its connections. On the other hand, the topology of the PLC network may not coincide altogether with that of the wired network that supports it (for example, an electric-power distribution network). Consequently, the signal of the PLC network can propagate over the network that supports it beyond the boundaries of the PLC network.

Various applications that can be envisaged for a PLC network may include provisioning of a PLC network on, for example, an electric-power distribution network that already supports another PLC network. The fact that the PLC signal is able to propagate over the entire wired network can provide a source of conflict or incompatibility between the various PLC networks, for example, because they do not share similar communication or management rules at the level of time management.

SUMMARY

There is a need to be able to deploy a number of PLC sub-networks over one and the same wired network (for example, the electric-power distribution network) preventing collisions and conflicts between the various PLC networks. In this perspective, it is desirable for the various PLC networks to be isolated from one another, facilitating and rendering more reliable/controllable communications (even bidirectional communications) within the sub-networks. Added to the above is likewise the possibility of performing functions of monitoring the state of management of each PLC node, with the possibility of performing a function of location of the nodes of the PLC network.

One or more embodiments may also include a corresponding network, as well as a corresponding computer program product, which can be loaded into the memory of at least one computer and includes portions of software code that are able to execute the steps of the method when the product is run on at least one computer. As used herein, such a computer program product is understood as being equivalent to a computer-readable medium containing instructions for control of the processing system so as to co-ordinate execution of the method according to embodiments. Reference to "at least one" computer highlights the possibility of one or more embodiments being implemented in a distributed form.

One or more embodiments may envisage connection of a given set of devices through one and the same wired network (with the capacity for conveying electrical energy and/or data), with the possibility, by the devices themselves, of managing operation at a PLC level.

One or more embodiments can find application in one or more of the following contexts such as area networks of a domestic type, whether private or industrial; data centers and server networks; street-lighting networks and traffic-artery networks, and networks with distributed energy sources; networks for recharging electric vehicles; and smart networks for distribution of electric power, both a.c. and d.c.

BRIEF DESCRIPTION OF THE DRAWINGS

One or more embodiments will now be described, purely by way of non-limiting example, with reference to the annexed figures, wherein:

FIG. 3 is a diagram of possible criteria of operation according to one embodiment of the invention;

FIG. 4 is a diagram of possible criteria of operation of according to another embodiment of the invention;

DETAILED DESCRIPTION

In the ensuing description, numerous specific details may be provided to enable an in-depth understanding of examples of various embodiments. The embodiments may be implemented without one or more of the specific details, or with other methods, components, materials, etc. In other cases, well known structures, materials, or operations may not be represented or described in detail so that aspects of the embodiments will not be obscured. Any reference in the ensuing description to "an embodiment" or "one embodiment" means that a particular distinctive element, structure, or characteristic described with reference to the embodiment may be included in at least one embodiment. Hence, recurrence of the phrase "in an embodiment" or "in one embodiment" appearing in various points of the present description may not necessarily refer to one and the same embodiment. Furthermore, the particular distinctive elements, structures, or characteristics may be combined in any adequate way in one or more embodiments.

Figure 1:
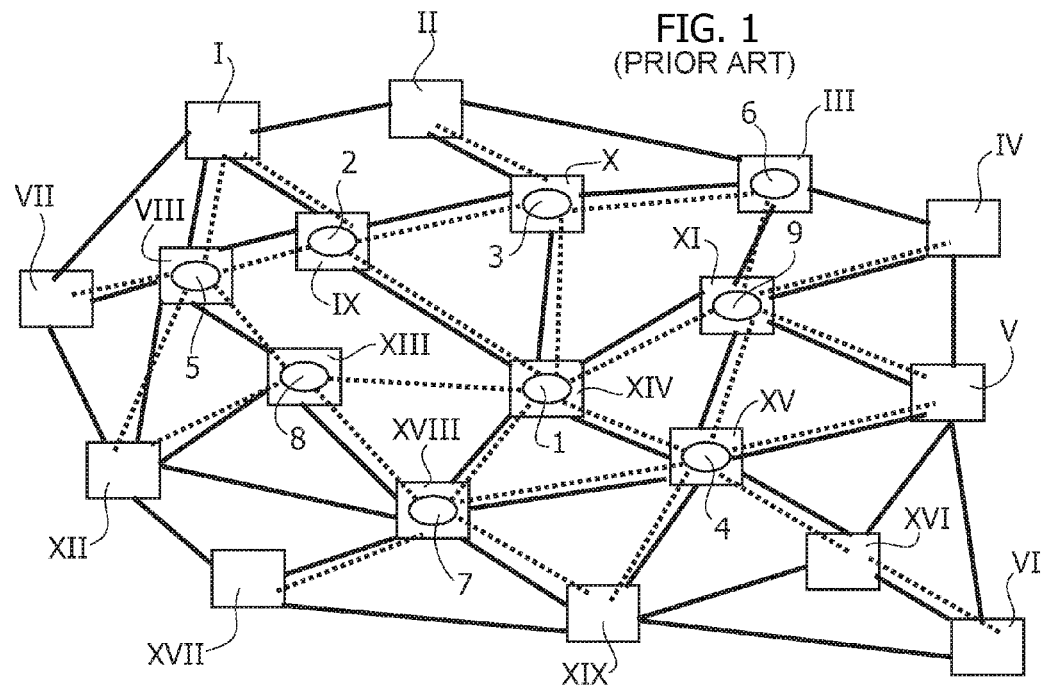
FIG. 1 is a general diagram of a PLC network as in the prior art to which one or more embodiments can be applied.

FIG. 1 exemplifies a possible structure of a communication network of a PLC (Power Line Communications) type. In one or more embodiments, such a network can include a wired network, for example, a pre-existing electric-power distribution network.

In particular, the Roman numerals I to XIX of FIG. 1 identify the nodes of the wired network (reference will be made for simplicity to an electric-power distribution network) connected together by respective connections (wires or cables). Arabic numerals 1 to 9 designate the nodes of a PLC network that may be obtained (according to known criteria) by exploiting the infrastructure of the physical connections represented by the wired network.

In the annexed figures, the cables of the wired "physical" network (for example, an electric-power distribution network) are represented as pairs of continuous lines. The connections of the PLC network are, instead, represented as single dashed lines (or dashed-and-dotted lines). It will be appreciated that this distinction merely has the purpose of highlighting the modes of propagation of the signals of the PLC network. The signals of the PLC network are transmitted on the connections (cables) of the wired network such as the electric-power distribution network, for example.

FIG. 1 highlights the fact that, in one or more embodiments, the PLC network may comprise a plurality of nodes 1 to 9 with lines that extend between them for propagating PLC signals between the nodes by exploiting the lines of the wired network. In fact, it is possible that not all the nodes I to XIX of the wired network "house" corresponding nodes 1 to 9 of the PLC network. The different Arabic and Roman numbering brings out this aspect in FIG. 1.

FIG. 1 likewise highlights the fact that the paths of possible propagation of the signal of the PLC network (indicated by dashed lines), in addition to extending between nodes 1 to 9 of the PLC network, can extend from and towards nodes of the wired network in which no nodes of the PLC network are present. This is shown, for example, by the nodes I, II, IV, V, VI, VII, XII, XVI, XVII, and XIX). Thus, the uncontrolled propagation of the signal of the PLC network may underlie negative effects already mentioned in the introductory part of the present description.

Figure 2:
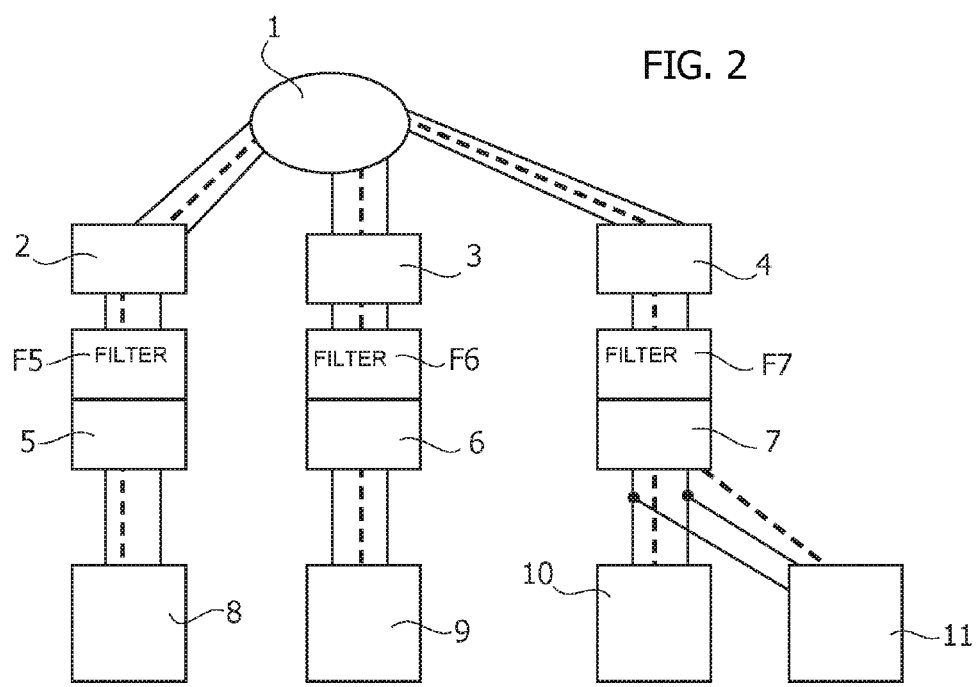
FIG. 2 is a general architectural diagram of one or more embodiments of the invention.

The diagram of FIG. 2 exemplifies the fact that, in the context of a PLC network as illustrated in FIG. 1, a node such as the node 1 can be connected, for example, with nodes such as the nodes 2, 3 and 4. Nodes 2, 3 and 4, in turn, can be connected as follows: the node 2 to the node 5, in turn connected to the node 8; the node 3 to the node 6, in turn connected to the node 9; and the node 4 to the node 7, in turn connected to further nodes (designated as nodes 10 and 11).

In the diagram exemplified in FIG. 2, the various nodes of the PLC network are organized in a tree structure including three branches, i.e., a first branch with the nodes 2, 5, and 8, a second branch with the nodes 3, 6, and 9, and a third branch with the nodes 4, 7, 10, and 11.

It will be appreciated that the representation of FIG. 2 is provided purely by way of example and presents only some of a large number of possible connections in the framework of a given PLC-network topology.

The diagram of FIG. 2 exemplifies the possibility of associating to a set of one or more nodes (for example, the nodes designated by 5, 6, and 7) respective filters F5, F6, and F7, which can be used for implementing a function of partition of the PLC network and selectively countering the propagation of the PLC signals.

For instance, each branch of the tree scheme of FIG. 2 comprises a proximal portion and a distal portion of the branch separated by a node (the nodes 5, 6, and 7, in the example considered here), to which partitioning filters F5, F6, F7 are coupled.

In one or more embodiments, these filters may be constituted by so-called "dedicated" filters (in so far as they are associated to a given node), which may be selectively activated/deactivated with the purpose of performing their filtering function.

For example, when the filters F5, F6, F7 are deactivated, the signal of the PLC network can pass through the corresponding nodes 5, 6, 7. When the filters F5, F6, F7 are activated, the propagation of the PLC signals through the corresponding nodes 5, 6, 7 are countered (for example, subjected to a high value of attenuation) so as to be in effect prevented or blocked in so far as the signals are unable to propagate to an appreciable extent through the respective nodes 5, 6, 7.

The filters F5, F6, and F7 of FIG. 2 may comprise the widest range of known technologies for the above purpose. These may, for example, be passive filters or active filters. The filters may include, for example, components such as capacitors, inductors, and resistors, where the characteristics (cutoff frequency, passband, type of filter: lowpass, highpass, bandpass, etc.) of which can be chosen within a wide range of solutions known to the person skilled in the art, and also according to the characteristics of the PLC signal (frequency, type of modulation, etc.) and the "physical" characteristics of the network (noise, loads, type of lines, etc.). Similar considerations apply to the possibility of using, for example, opto-insulators or similar components, or else components having the nature of a switch.

As used in the present description and, where necessary, in the ensuing claims, the term "filter" is intended to include any component that can perform a selective action of attenuation and/or blocking of the PLC signals in order to carry out an action of partitioning of the corresponding network.

The possibility of associating to nodes of the PLC network filters, such as the filters F5, F6, F7 exemplified in FIG. 2, makes it possible to envisage for the devices that may be connected to the PLC network. This includes at least three different types such as controller devices (S5, S6, S7) coming under filters such as the filters F5, F6, F7, with the consequent capacity for activating/deactivating the filters in question so as to control activation of the aforesaid partitioning filters F5, F6, F7 and control the flow of information in the framework of the PLC network; devices with the role of "master" (e.g., concentrator), configured for managing activation of the partitioning filters F5, F6, F7, for example via controller devices, so as to manage partitioning of the PLC network into sub-networks, and possibly performing functions of data storage and of time management of the applications (for example, at the level of time frames); and devices under control, which do not have control over the above partitioning filters (F5, F6, F7), and are devices that are able to act as "slaves" without the capacity of intervention on filters such as the filters F5, F6, F7.

In this regard, it will be appreciated that one or more embodiments may envisage just the presence of nodes of the PLC network corresponding to the first type (i.e., nodes with the filters associated thereto). These devices may possibly function as master devices, in accordance with the second type outlined above. In one or more embodiments, no "slave" node may be present corresponding to the third type outlined above.

It will likewise be appreciated that, in the case of nodes such as the node 7 of FIG. 2, under which the two nodes 10 and 11 are shown, the filter F7 may be doubled, with the consequent possibility of intervening selectively and independently on the connection between the node 7 and the node 10, on the one hand, and the connection between the node 7 and the node 11, on the other hand.

The above possibility (which can be extended also to a larger number of nodes) has not been explicitly represented herein so as not to encumber unnecessarily exemplification of the embodiments.

FIGS. 3 and 4 exemplify possible modalities of connection between the various nodes exemplified in FIG. 2 according to the activation/deactivation of the filters F5, F6, F7.

For instance, FIG. 3 refers to a situation where the three filters F5, F6, and F7 are all deactivated. In these conditions, the signal of the PLC network is able to propagate freely between the node 2, the node 5, and the node 8; between the node 3, the node 6, and the node 9; and between the node 4, the node 7, and the nodes 10 and 11.

In these conditions, the nodes of the architecture already exemplified in FIG. 2 may be viewed as being comprised in a single network S.

FIG. 4 exemplifies, instead, a situation where the filters F5, F6, and F7 are activated and counter (e.g., by applying a high value of attenuation on) propagation of the signal of the PLC network through the associated nodes 5, 6, 7.

In these conditions, here presented purely by way of example, the node 1 is in communication with the nodes 2, 3 and 4 in the framework of a first sub-network S1; the node 5 is in communication with the node 8 in the framework of a sub-network S2; the node 6 is in communication with the node 9 in the framework of a sub-network S3; and the node 7 is in communication with the nodes 10 and 11 in the framework of a sub-network S4.

The foregoing with the sub-networks S1, S2, S3 and S4 are able to operate independently of one another, without giving rise to situations of conflict in so far as the sub-networks in question are in effect separated or isolated from one another.

In particular, within the tree scheme exemplified in FIG. 2, activation of partitioning filters F5, F6, F7 may mean that the distal portion (i.e., in the nodes 5 and 8, the nodes 6 and 9, and the nodes 7, 10 and 11) of each branch may form one of the aforesaid sub-networks S1, S2, S3, S4.

It will be appreciated on the other hand that the combinations represented in FIGS. 3 and 4 are only two (of the eight possible) combinations of activation/deactivation of the filters F5, F6, F7, with each of these combinations that may lead to a corresponding different configurations of sub-networks.

Figure 5:
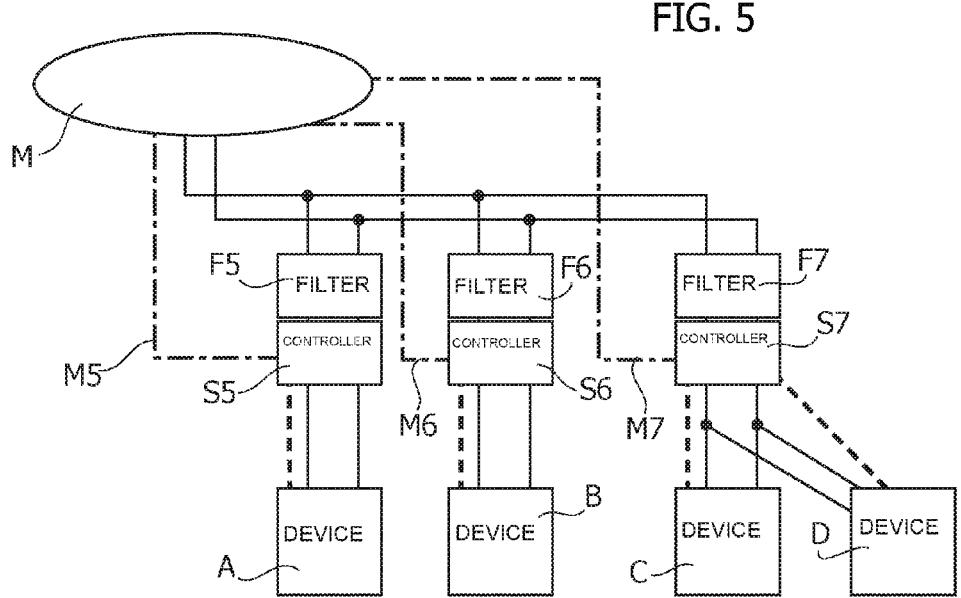
FIG. 5 is a diagram of a type of network that can be obtained according to one embodiment of the invention.

FIG. 5 exemplifies possible modes of intervention of a node M (illustrated here as corresponding to the node 1, but identifiable in a different way in the framework of the PLC network), which is entrusted with the function of master node as regards to the possibility of controlling the position and possible changes in the connections of various devices A, B, C, D. The devices A, B, C, and D may be assumed as being connected to a common wired line with a bus structure by way of elements having the function of "plugs", i.e., with dedicated connections so as to enable their connections to be changed independently.

In one or more embodiments, the control system may comprise fixed PLC nodes connected in parallel to plugs S5, S6 and S7 which correspond to the first type of node considered previously, with the possibility of managing activation of corresponding filters (e.g., the filters F5, F6, F7, to use the same exemplification already introduced in the preceding figures) so as to be able to control selectively propagation of the signal of the PLC network.

The device M that functions as master may consequently gather, for example, via the lines M5, M6, M7, information from the plugs S5, S6, S7 during deactivation of the filters F5, F6, F7.

The devices in question, which may be referred to as "Devices Under Control" (DUCs), can form part of an ensemble to be controlled with the capacity of communicating (in a unidirectional or bidirectional way) with the physical network via the plug components S5, S6 and S7. In one or more embodiments, these components may be "smart" components (smart plugs).

The master node M is physically coupled to the wired network and is consequently able to exchange data on the aforesaid network with the components S5, S6, and S7, for example, via the channels M5, M6, and M7, which even though they are represented ideally as distinct from the cables of the wired network, in effect coincide with the cables of the aforesaid network on which the corresponding data signals are transmitted according to the modalities of operation of PLC networks.

For instance, in one or more embodiments, in a topology as exemplified in FIG. 5, the smart plugs S5, S6, and S7 may be able to detect which devices A, B, C, D are connected to them and activate the corresponding filter F5, F6, and F7 so as to give rise to a PLC sub-network, the range of which is limited to the area controlled by the plugs S5, S6, S7 (by way of example, reference may be made to the diagram of FIG. 4, where the sub-networks S2, S3, S4 are represented).

In one or more embodiments, the components S5, S6, S7 can detect data of the devices A, B, C and D and send them to the master node M by deactivating the associated filter so as to open a PLC communication channel (lines M5, M6 and M7) between the single component or plug S5, S6, and S7 and the master M. In this regard, it is once again recalled that, albeit represented in FIG. 5 in a way distinct from the wires of the wired network, the channels M5, M6, and M7 may coincide at a physical level with the wires of the wired network.

In one or more embodiments, possible changes in the modalities of connection of the devices A, B, C, and D (for example, the fact that a device previously connected is disconnected or else the fact that a new device is connected) may be detected by the components S5, S6, and S7, for example, via periodic operations of detection and/or as a result of messages sent by the devices A, B, C, D at the moment of their connection/disconnection.

In one or more embodiments, the smart plugs S5, S6, and S7 may be provided in the framework of the network in positions fixed to unique addresses.

In one or more embodiments, the master device M can have the capacity of storing codes (for example, numbers) identifying the components S5, S6, and S7 and their addresses (i.e., their location).

In a similar way, it is possible to attribute unique identifiers to the devices A, B, C, and D.

In one or more embodiments, the components S5, S6 and S7 may perform operations of detection on the devices A, B, C, and D connected thereto with the possibility of performing one or more functions, such as for example, activation of the associated filter F5, F6, F7 so as to enable communication between the component S5, S6, and S7 and the device/devices associated thereto in the framework of a sub-network independent of and isolated from the rest of the network; sending of dedicated messages (for example, "discovery" frames) with the consequent possibility by a component S5, S6, S7 of finding the device or devices connected thereto, e.g., with automatic reply on the part of the devices A, B, C, and D to the aforesaid messages; storage, at the level of component S5, S6, S7, of information regarding the devices A, B, C, and D (unique identifier, state of the device, etc.); verification of the state of devices A, B, C, and D already associated to a certain component S5, S6 and S7 via dedicated messages; and upon completion of verification, control of the filter in order to enable possible communication towards the master M (channels M5, M6, M7).

Likewise, in one or more embodiments, the master M may periodically control the activity of the components S5, S6 and S7, for instance by using address fields for managing the source and destination of the messages, with the possibility on the part of the components S5, SE, and S7 of sending to the master M information on the devices A, B, C, and D.

Figure 6:
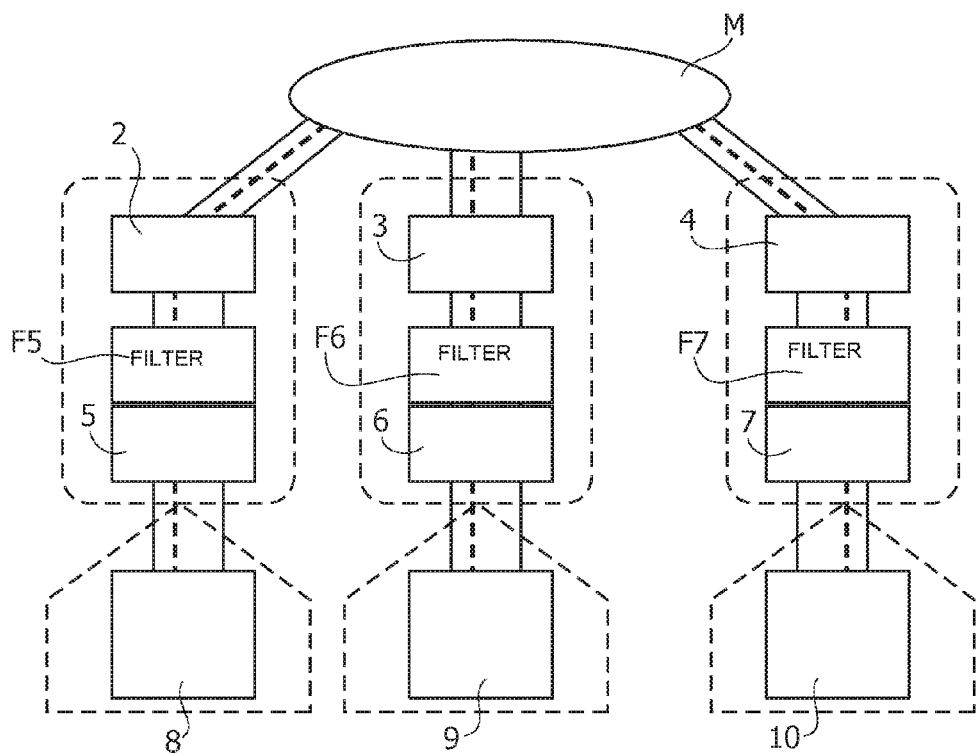
FIG. 6 is a diagram of a type of network that can be obtained according to another embodiment of the invention.

The diagram of FIG. 6 (where the same references identify parts and components that are similar or analogous to the ones already presented in the previous figures, so that the corresponding description will not be repeated) exemplifies a possible application to a context of PLC network that includes nodes with different electrical parameters (for example, modulation, carrier frequency, etc.) on one and the same wired network.

As explained previously, this shared vector means may underlie phenomena of collision between communication data coming from different sub-networks, whereas one or more embodiments enable creation of sub-networks (e.g., S1, S2, S3, S4 in FIG. 4) presenting logic boundaries that do not cross/overlap. When the partition filters, such as the filters F5, FE, and F7, are activated, the various nodes of the PLC can be connected via a physical connection (wired line), which connects them independently to at least one other node of the PLC network.

FIG. 6 exemplifies a possible application to a context of network of an AMI (Advanced Metering Infrastructure) type, for example, for metering energy to users at a domestic level.

In this case, the node 5, the node 6, and the node 7, together with the corresponding filters F5, F6, F7 and the corresponding nodes 2, 3, 4 under which they are shown can assume the role of electricity meters even in the presence of different electrical parameters. This gives rise to separate PLC interfaces of the filters F5, FE, F7 (the first type of node introduced previously), with the "domestic" nodes 8, 9, and 10 that communicate with the respective electricity meter, i.e., with the nodes 5, 6, and 7 via a PLC interface, that is, with modalities substantially corresponding to those of the third type of node outlined previously.

In one or more embodiments, the configuration exemplified in FIG. 6 is suited to performing one or more of the functions described hereinafter.

The master M (e.g., the node 1) may be located on the connection network so as to be able to gather information from the various electricity meters (e.g., the nodes 2, 3, 4) according to the respective modulations and protocols (which may also be different from one another). This may occur, for example, according to the modalities exemplified previously with reference to FIG. 5 as regards communication between the master M and the smart plugs S5, S6, and S7.

The electricity meters form part of the AMI system, with the possibility for the domestic devices 8, 9, and 10 to communicate (exclusively) with the corresponding electricity meters (e.g., the nodes 5, 6, 7) on the basis of a respective modulation/protocol scheme (which may be the same as the one adopted in the AMI system or else be different).

The electricity meters can periodically exchange information with the domestic devices, e.g., with the electricity meter (nodes 5, 6, 7), which, by activating its own filter, restricts the possibilities of transmission of the PLC signals to just the sub-network formed together with the domestic node 8, 9, and 10 connected thereto. Added to this is the possibility of synchronising communication between the two devices with the AMI system, for instance, with the possibility of envisaging a mechanism that exploits the blanking time of the AMI standard. The master M can periodically control the activity of the various electricity meters, for example using address fields so as to manage sources and destinations of the messages.

Of course, without prejudice to the underlying principles, the details of construction and the embodiments may vary, even significantly, with respect to what has been illustrated herein purely by way of non-limiting example, without thereby departing from the extent of protection of the invention.

The above extent of protection is defined by the annexed claims.

The invention claimed is:

1. A method of operating a Power Line Communications (PLC) network comprising a plurality of nodes coupled together and configured to propagate PLC signals between the plurality of nodes, the method comprising:
   selecting one of a plurality of combinations of nodes to define a plurality of branches, each branch having a partitioning filter coupled to at least one node of a respective branch;
   activating a respective partitioning filter coupled to the at least one node of the respective branch to partition the at least one node within the respective branch to define a first configuration of a sub-network of the PLC network to counter propagation of the PLC signals through the sub-network; and
   de-activating the respective partitioning filter to define a second configuration of the sub-network to permit propagation of the PLC signals through the respective branch.

2. The method of claim 1, wherein at least one device is coupled to the PLC network, the at least one device comprises at least one of a controller device configured for controlling activation of the partitioning filter, a master device configured for managing activation of the partitioning filter by the controller device, and a device under control of the master device and having no control of the partitioning filter.

3. The method of claim 2, wherein when the device under control of the master device is coupled to at least one node, the method further comprises:
   activating the partitioning filter coupled to the at least one node so that the at least one node and the device under control of the master device coupled thereto are included in one sub-network.

4. The method of claim 2, wherein when the master device is coupled to the PLC network, the method further comprises:
   storing address identifiers of the controller device managed by the master device therein.

5. The method of claim 2, wherein when the master device is coupled to the PLC network, the method further comprises:
   selectively de-activating the partitioning filter to permit propagation of the PLC signal between the controller device and the master device.

6. The method of claim 1, wherein when at least one electrically powered user device is coupled to the sub-network, the sub-network defines a metering sub-network for metering electrical power to the at least one electrically powered user device.

7. A Power Line Communication (PLC) network comprising:
   a plurality of nodes configured to be coupled to a plurality of wirelines for propagating PLC signals between the plurality of nodes;
   a partitioning filter coupled to a node of one of a plurality of combinations of nodes and configured to partition the node to define a first configuration of a sub-network of the PLC network to counter propagation of the PLC signals through the sub-network;
   at least one controller device configured to selectively activate the partitioning filter; and
   at least one master device coupled to the PLC network and configured to selectively de-activate the partitioning filter to define a second configuration of the sub-network to permit propagation of the PLC signals between the at least one controller device and the at least one master device.

8. The PLC network of claim 7, wherein the at least one master device has address identifiers of the at least one controller device stored therein.

9. A non-transitory computer readable medium storing instructions that, when executed, cause a computing device to perform steps of operating a Power Line Communications (PLC) network comprising a plurality of nodes coupled together and configured to propagate PLC signals between the plurality of nodes, the steps comprising:
- selecting one of a plurality of combinations of nodes to define a plurality of branches, each branch having a partitioning filter coupled to at least one node of a respective branch;
- activating a respective partitioning filter coupled to the at least one node of the respective branch to partition the at least one node within the respective branch to define a first configuration of a sub-network of the PLC network to counter propagation of the PLC signals through the sub-network; and
- selectively de-activating the partitioning filter to define a second configuration of the sub-network to permit propagation of the PLC signals through the sub-network.

* * * * *

UNITED STATES PATENT AND TRADEMARK OFFICE
CERTIFICATE OF CORRECTION

| | | |
|---|---|---|
| PATENT NO. | : 9,356,655 B2 | Page 1 of 1 |
| APPLICATION NO. | : 14/791966 | |
| DATED | : May 31, 2016 | |
| INVENTOR(S) | : Colombo et al. | |

It is certified that error appears in the above-identified patent and that said Letters Patent is hereby corrected as shown below:

In the Claims

Column 8, Lines 60 and 61,      Delete: "filter"
Claim 7      Insert --filter via the at least one controller device--

Signed and Sealed this
Second Day of August, 2016

Michelle K. Lee
*Director of the United States Patent and Trademark Office*